(12) United States Patent
Ayhan et al.

(10) Patent No.: US 11,725,256 B2
(45) Date of Patent: Aug. 15, 2023

(54) METHOD FOR RECOVERING METALS FROM SECONDARY MATERIALS AND OTHER MATERIALS COMPRISING ORGANIC CONSTITUENTS

(71) Applicant: AURUBIS AG, Hamburg (DE)

(72) Inventors: Mehmet Ayhan, Selm (DE); Marcus Eschen, Senden (DE)

(73) Assignee: AURUBIS AG, Hamburg (DE)

( * ) Notice: Subject to any disclaimer, the term of this patent is extended or adjusted under 35 U.S.C. 154(b) by 309 days.

(21) Appl. No.: 16/735,245

(22) Filed: Jan. 6, 2020

(65) Prior Publication Data
US 2020/0140973 A1 May 7, 2020

Related U.S. Application Data

(63) Continuation-in-part of application No. 15/315,574, filed as application No. PCT/DE2015/000219 on Apr. 30, 2015, now abandoned.

(30) Foreign Application Priority Data

Jun. 13, 2014 (DE) ..................... 10 2014 008 987.8

(51) Int. Cl.
*C22B 15/00* (2006.01)
*C22B 11/12* (2006.01)
(Continued)

(52) U.S. Cl.
CPC ........ *C22B 15/0054* (2013.01); *C22B 11/044* (2013.01); *C22B 11/12* (2013.01); *C22B 15/0043* (2013.01)

(58) Field of Classification Search
CPC ... C22B 15/0054; C22B 11/044; C22B 11/12; C22B 15/0043; C22B 1/005; C22B 11/046; Y02P 10/20
(Continued)

(56) References Cited

U.S. PATENT DOCUMENTS 1,506,053 A 8/1924 Fink
2,042,291 A 5/1936 Betterton et al.
(Continued)

FOREIGN PATENT DOCUMENTS

CA 2507673 A1 12/2005
DE 102005021656 A1 11/2006
(Continued)

OTHER PUBLICATIONS

Database WPI Week Aug. 2012 Thomson Scientific, London, GB; AN 2012-B06976 XP002743171.
(Continued)

*Primary Examiner* — Brian D Walck
*Assistant Examiner* — Danielle Carda
(74) *Attorney, Agent, or Firm* — Lucas & Mercanti, LLP; Klaus P. Stoffel

(57) ABSTRACT

A method for recovering metals, such as noble metals or copper, from secondary materials and other materials having organic constituents, wherein the organic components are extracted from the secondary materials and other material by thermal treatment in a process chamber and the secondary materials and other materials having organic constituents are prepared for the recovery process.

19 Claims, 1 Drawing Sheet

(51) Int. Cl.
*C22B 15/06* (2006.01)
*C22B 11/00* (2006.01)

(58) Field of Classification Search
USPC .......................................................... 75/640
See application file for complete search history.

(56) References Cited

U.S. PATENT DOCUMENTS

| | | | | |
|---|---|---|---|---|
| 4,415,360 | A * | 11/1983 | Leirnes | C22B 1/005 |
| | | | | 432/13 |
| 7,976,611 | B2 | 7/2011 | Beyer et al. | |
| 9,925,491 | B2 | 3/2018 | Clarke | |
| 2005/0284261 | A1* | 12/2005 | Sandberg | C22B 19/30 |
| | | | | 75/375 |
| 2011/0311423 | A1* | 12/2011 | Clarke | B01D 53/8696 |
| | | | | 422/108 |

FOREIGN PATENT DOCUMENTS

| | | | |
|---|---|---|---|
| DE | 102012005401 A1 | 9/2013 | |
| EP | 0185004 A1 * | 6/1986 | ............ C22B 15/14 |
| WO | 7900104 A1 | 3/1979 | |
| WO | 2012008453 A1 | 1/2012 | |

OTHER PUBLICATIONS

Ogunniyi I. 0. et al. "Chemical composition and liberation characterization of printed circuit board comminution fines for beneficiation investigations." Waste Management. vol. 29. pp. 2140-2146. dol:10.1016/j.wasman.2009.03.004 (Year: 2009).

Ayres R.U., Ayres L.W., Rade I. (2003) the Future of Recycling. In: The Life Cycle of Copper, Its Co-Products and ByProducts. Eco-Efficiency in Industry and Science, vol. 13. Springer, Dordrecht. pp. 149-168. https://doiorg/10.1007/978-94-017-3379-3_5 (Year: 2003).

* cited by examiner

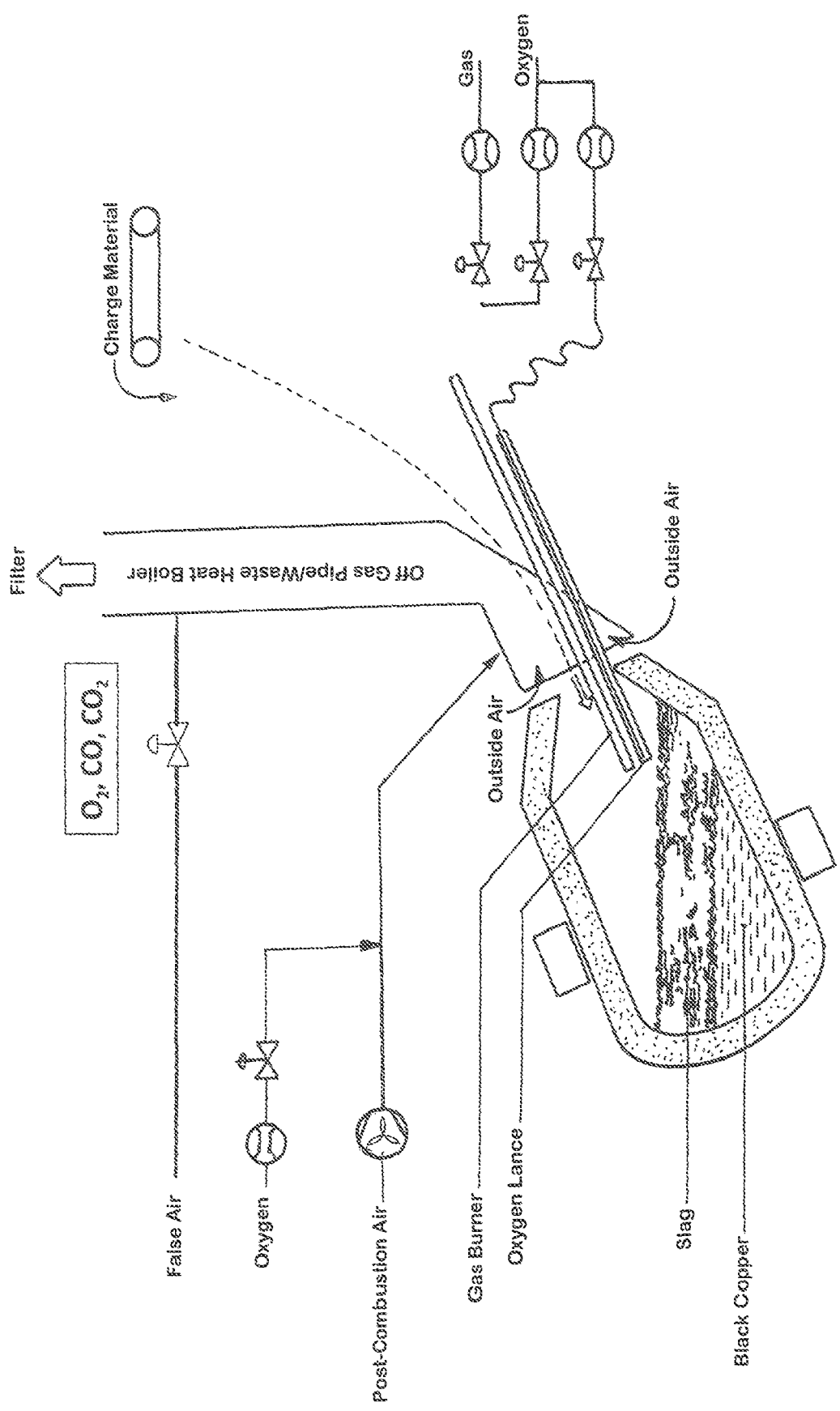

METHOD FOR RECOVERING METALS FROM SECONDARY MATERIALS AND OTHER MATERIALS COMPRISING ORGANIC CONSTITUENTS

The present application is a continuation-in-part of U.S. patent application Ser. No. 15/315,574, filed Dec. 1, 2016, which is a 371 of International application PCT/DE2015/000219, filed Apr. 30, 2015, which claims priority of DE 10 2014 008 987.8, filed Jun. 13, 2014, the priority of these applications is hereby claimed and these applications are incorporated herein by reference.

BACKGROUND OF THE INVENTION

The invention pertains to a method for recovering metals such as noble metals or copper from secondary materials and other materials comprising organic constituents, wherein the organic components are extracted from the secondary materials and other materials by a thermal treatment in a process chamber, and the secondary materials and other materials comprising organic constituents are prepared for the recovery process.

Methods for recovering metals from secondary materials and other materials comprising organic constituents by both continuous and discontinuous processes are known from the prior art. The concept of continuity usually pertains to the feed of the secondary material into the method and to the course of the method in itself. It is also possible, however, to distinguish between the continuous or discontinuous feed of the secondary material and the continuous or discontinuous thermal treatment in the process chamber. It is also known that the recovery can be realized by a purely mechanical treatment or by a combination of the two processes, such as a thermal treatment preceded by a preliminary mechanical treatment.

The thermal treatment inside a process chamber is usually realized by pyrolytic decomposition, combustion, or gasification. During pyrolysis, bonds, especially the bonds of the large molecules, are broken by the thermochemical cleavage of organic compounds; this occurs by the exclusive action of high temperatures in a range of 200-900° C. The result is that the organic material is obtained in solid form as a separation product, frequently referred to as "pyrolysis coke". In the case of combustion and gasification, the temperature is increased, and oxygen or other gasification agents are also supplied to convert the organic components of the secondary materials into a gaseous aggregate state. The use of electronic scrap in a rotary kiln is also known.

DE 10 2005 021656 A1 discloses a continuous recovery method for metals, especially noble metals, from secondary materials, wherein the organic components are extracted from these secondary materials in a continuous process by thermal treatment in a process chamber and then oxidized. The secondary materials are introduced continuously into a process chamber for thermal treatment under continuous intensive mixing, so that the organic components are extracted continuously and then oxidized, and the metal-containing components and the other inorganic, nonmetal-containing components are discharged continuously from the process chamber. This means that the process does not proceed in a cyclic manner, where the various steps of the process are separate and carried out in succession; an example would be a process operating under batchwise conditions, where the process chamber is first loaded with the secondary materials and subjected to the thermal treatment, after which they are removed. On the contrary, what this document describes is a continuous, now-through method.

Methods for recovering metals from secondary materials and other materials comprising organic constituents as part of both continuous and discontinuous methods with respect to the loading or the removal of materials from the process chamber are thus known from the prior art. Also known are continuous and discontinuous methods within the process chamber, i.e., the thermal treatment itself.

In all of the known methods, the various steps of the method, including the control of the feed quantities of secondary materials and oxygen; the input of heat energy and various process gases; the removal quantities and times; and the process management in itself are controlled on the basis of various specific parameters. The device for realizing the thermal treatment is very often a TRBC (Top Blown Rotary Converter). This is a preferably cylindrical, elongated melting furnace, which can be rotated around its long axis and also pivoted around its transverse axis. The melting furnace, which starts out empty, is pivoted into a position in which the preferably one opening of the furnace is arranged so that the secondary materials can be loaded easily. Then the melting furnace is pivoted into an operating position in which the axial axis of the melting furnace is between a horizontal and a vertical position. The method is carried out under the application of high temperatures, by the feed of gasifying agents such as oxygen, and under constant or variable rotational speed of the melting furnace around its center axis. The results of this process for recovering metals in the form of copper are the gasified organic components, a copper phase, and a slag.

Common to all of the efforts to improve the recovery process is the goal of increasing the throughout of recycled metal, especially copper. In other words, the goal is to increase the efficiency, especially the throughout and/or the chamber-time, of the processes with respect to, for example, the amount of energy consumed. To achieve this, it is desirable for the process chamber to be loaded continuously and for the process steps to be carried out in a continuous sequence. Another goal is to use more recycling materials rich in organic components. Considerable problems, however, are caused by gasified organic components, which can be in the form of high-energy gas or as a gas with a high pollutant load. The impurities can be of a solid and/or gaseous nature such as various dusts, furans, dioxins, and halogen acids.

SUMMARY OF THE INVENTION

According to the invention, the problems to be solved are in particular those caused by large variations in the charge material, which can result in differences in the types and amounts of gases being formed and in different amounts of excess energies during the combustion processes. Without appropriate countermeasures, these variations can lead to extremely conservative charging and/or to a drop in the charging speed. This results in deviations from the goal to be achieved by the operation of the plant and to a deterioration of both the technical and economic results.

A considerable influence can be exerted on the pollutant load by optimizing the management of the various process parameters. The continuous loading of the process chamber causes nonsteady process states, which result in considerable deviations from the optimal process states with respect to the goal of minimizing pollutants and therefore lead to heavy off-gas contamination. In the end, therefore, increasing the efficiency of the recovery process, i.e., increasing the rate at which the recycling material is processed, by adopting a continuous work method leads to an increase in the pollutant load of the off gas. One reason for these nonsteady process states is the pronounced homogeneity of the charge material.

Environmental safety and health protection forbid the discharge of contaminated gases into the outside air. For this reason, expensive purification steps are required to remove the toxic substances from the off gas. Downline gas coolers, scrubbers, and bag filters are used for this purpose.

The goal of the present invention is to provide a method which makes it possible to increase the quantity of charge material while preventing the concentration of pollutants in the off gas from increasing at the same time. In particular, the quantity of processable charge material containing organic material is to be increased.

To achieve this goal, the teaching according to the invention proposes the use of a two-stage method arrived at by combining a process chamber for recovering metals from secondary materials and other material with organic constituents with a furnace for recovering mixed tin from the slag.

For the melting of complex secondary materials with organic constituents, a method is proposed in which a TBRC (Top Blown Rotary Converter) as the process chamber and a furnace for mixed tin recovery cooperate in a predefined manner. What is involved is a method for recovering metals from secondary materials and other materials with high levels of organic constituents. The TBRC is operated in batch mode.

The first stage of the process yields an impure copper, so-called "black copper", which, according to a first variant of the method, is converted in the same unit to blister copper in the following oxidation stage. According to a second method variant, further processing takes place in a separate unit. The other target product of the melting stage is a final, metal-poor slag. In the second process stage, not only the blister copper but also a tin-rich and lead-rich slag is produced. From this slag, a crude mixed-tin alloy is produced in the mixed-tin furnace.

The starting material to be melted consists of secondary materials and other materials with organic constituents, i.e., recycling materials, some with high levels of organic constituents and others with low levels, combined in predefined ratios, wherein the quantity of the materials with high organic constituent levels such as electronic scrap, cable scrap, plastic scrap from electrical/electronic devices, etc., accounts for approximately 50%. The total amount of organic material is usually in the range of 5-60%, especially 10-40%.

Exemplary embodiments of the invention are illustrated schematically in the diagram.

BRIEF DESCRIPTION OF THE DRAWING

FIG. 1 shows a schematic diagram illustrating one variant of the invention with post-combustion.

DETAILED DESCRIPTION OF THE INVENTION

The complex secondary materials with organic constituents are subjected not only to standard sampling but also to a characterization with respect to their energy content and amounts of slag formers, the purpose being to obtain information useful to process management. The energy content is important with respect to the achievable throughput of secondary materials with organic constituents and thus to the quantity of metals which can be recovered. The information on the slag formers (Fe/FeO, $SiO_2$, $Al_2O_3$, CaO, $Na_2O$, $K_2O$, Mn, Cr) is important for slag management with respect to the desired low viscosity and valuable metal content.

The large quantities of high-melting components in these feed materials, especially in the form of $Al_2O_3$, $SiO_2$, and metallic aluminum, which is always present and which also oxidizes to $Al_2O_3$, lead during such melting processes to high-melting, high-viscosity slags, which make it especially difficult to obtain a slag poor in valuable metal. The other feed materials and intermediate products are subjected to the conventional sampling process.

In particular, the complex secondary materials with organic constituents must be brought into a firm which electively supports continuous charging. What is desired is a continuously chargeable secondary material component of over 80%. For this purpose, the organic secondary materials are grouped according to the characterization results and used to prepare appropriate feed mixtures.

So that the various grain sizes, lump sizes, and materials can be charged continuously, a charging system is proposed consisting of charging bins with adjustable material discharge rates and conveyor belts as well as pneumatic conveyors, which are coordinated with each other and operate as a system to bring the feed material to the process chamber. The material is then conveyed by gravity into the process chamber. The materials not suitable for continuous charging (too coarse, impossible to crush, impossible to cut into pieces, etc.) are fed into the continuous material stream either via charging troughs or directly into the process chamber.

The characterization and preparation of the recycling materials are extremely important with respect to the reliable control of the off-gas system and the pollutant or fuel gas components. The feed materials in the form of complex secondary materials with organic constituents are divided into a few groups on the basis of their energy contents and off-gas generation. The types with the same or similar properties are combined and possibly comminuted by various known, mostly mechanical methods. From the groups of feed materials with different properties, a working mixture with sufficiently uniform behavior in the process chamber, formed by the TBRC, is assembled and loaded into bins by means of weighing devices. The additives intended to from a highly fluid, copper-poor slag also belong to this overall feed mixture. Special attention must be paid to additives such as limestone which they lead to gaseous reaction products.

The feed materials are divided into two main groups based on their lump size: smaller than about 150 mm, ensured by screening along the conveying route, and larger than 150 mm. The coarse fraction is charged into the TBRC through charging troughs. The continuous charging of the fine materials into the process chamber is achieved by way of a charging pipe, chute, or slide.

At the beginning of a charge, the process chamber either is empty or contains residual amounts of slag. Through suitable measures, it must be ensured that a sufficiently fluid slag is present in the process chamber as quickly as possible. Only by means of this highly fluid slag are the advantages of the bath melting method fully obtained. It has been found that, given secondary materials which have been characterized with sufficient accuracy and given the presence of the highly fluid slag, the process chamber formed by a TBRC yields uniform off-gas values (quantity, composition, and temperature) and thus runs at high throughputs. A TBR converter is also selected to form the process chamber because of its especially advantageous mass and energy transfer.

The TBRC is basically a process chamber which can be both rotated and tipped to obtain a molten bath. The chamber can be rotated around its long axis, whereas the tipping occurs in a second spatial direction, around an axis transverse to the long one. During the continuous charging of the material mixture, which contains the complex secondary materials with organic constituents, into the ongoing thermal treatment process, the material falls into the melt, wherein the gasification processes start immediately. The gases which form contain large amounts of soot, carbon monoxide, hydrogen, and other hydrocarbons. These gases rise up through the process chamber and are met by the oxygen blown into the process chamber and partially burned. The oxygen is introduced into the process chamber through a lance. Only partial combustion occurs in the process chamber. The process chamber gases, which still contain large amounts of combustible gases, are captured by an exhaust system and subjected to thermal post-combustion, after which the components are purified.

During the charging phase, the TBRC is operated at the highest possible rotational speed or peripheral velocity, i.e., about 15 rpm or 1-3 meters per second. The tilt of the process chamber can be adapted to the degree to which the process chamber is filled. Through the support of these measures as well, the maximum possible charging capacity is achieved for the process chamber. Charging takes place at a constant rate of material removal from the bins, which are filled with previously characterized material.

When the process chamber is in the working position, which is between a horizontal and a vertical position of the center axis of the process chamber, depending on the deice to which the chamber is filled, the oxygen lance is moved into the hot process chamber and, together with the planned charge, i.e., the quantity, energy content, and specific exhaust gas yield of the complex secondary materials with organic constituents, an appropriately adapted quantity of oxygen is blown into the process chamber. The positioning of the tip of the lance also contributes to the discharge of a uniform off gas from the process chamber after the start of the Charging process. Once the lance has been positioned, charging is begun.

The charge material, consisting of solid secondary materials with organic material constituents, is melted at the process chamber temperatures, which are above the melting point of these materials and usually above 1,200° C.; the materials react to form a metal melt and a liquid slag. The high rotational speed of the process chamber and the low-viscosity slag make it possible to achieve the desired high material conversion rates. The important preconditions are the preliminary task of characterizing the feed materials, especially the operating materials and additives, under the aspect of slag formation and the effective management of the slag through the continuous, simultaneous charging of the correct quantities and types of different materials via the continuous teed system. Thus, slow-to-react, highly viscous, thick slags and piles of unmelted charge material are avoided. The process chamber is used as a bath melting furnace, which is working close to its endpoint at all times.

The composition of the slag and the content of valuable metals still present in it are monitored during the melting process by taking samples and analyzing them rapidly. If necessary, the slag additives are modified. On the basis of the removed slag samples and their analysis, it is determined what corrective measures are necessary during or after the continuous charging phase.

If deviations are found in the analysis and valuable metal content of the slag, a short and effective reduction process is conducted, in that a lance is briefly immersed in the slag. As a result of this measure, a perfect equilibrium is achieved in the process chamber between the slag and the crude, iron-containing copper. This step ensures that the slag analysis will be low in valuable metal.

After the slag composition has reached the desired values, the slag is removed from the process chamber. The liquid metal remains in the process chamber until the quantity of crude metal has increased to the point recommended for the conversion process. Beginning with the metal present at the time, the process is repeated, until the quantity of metal melt optimal for the following step of the process has accumulated.

To exclude the possible negative effects on the behavior of the off gas caused under certain conditions by abrupt changes in the organic material content at the selected constant charging rate, the off gas system is designed with appropriate safety margins. This safety-oriented design provides for an excess of oxygen for post-combustion. As a result, after the completion of the post-combustion stage with about 10% oxygen, the off gas will contain sufficient oxygen. Even when there are sudden changes, the off gas will therefore contain enough oxygen, at 4-6%, to ensure that the post-combustion can be completed reliably at all times.

In particular, sorting the material to be processed according to appropriately specified criteria and storing the different types separately before the start of charging contribute to optimal process management. Upon completion of a simple sequence of steps, piles of material meeting the sorting criteria are obtained as product.

The off gas system, furthermore, makes it possible to blow pure oxygen into various points of the off gas stream. As a result, no problems are to be expected from the pollutants and fuel gas in the off gas system which might be caused by sudden fluctuations in the amounts of organic material within the complex secondary materials. In addition, economical operation of the facility is supported by the possibility of controlling the post-combustion in an open or closed-loop manner, which makes it possible to achieve the maximum yield of recovered material. The prompt characterization of the feed material is also adapted to the goal of achieving the maximum possible throughput from the thermal treatment device.

The emerging process chamber gases are captured by a hood and an off gas pipe, configured as a waste heat boiler. The exhaust system is dimensioned in such a way that a sufficient amount of air is also drawn in from the outside. Thus a clean thermal treatment process is ensured, in which the process gases cannot escape to the environment.

In the part of the hood adjacent to the process chamber are openings, through which post-combustion air enriched with oxygen is blown in at elevated pressure. The blowing-in of oxygen and air causes the pollutant-carrying process gases to burn in an area downline from the process chamber so-called "post-combustion".

The quantity can be regulated on the basis of the off gas analysis and temperature, measured in the area of the off-gas pipe adjacent to the off-gas purification systems. Thus the system can react to changes associated with variable levels of organic constituents in the secondary material at a constant mass rate-of-flow. As a result, it is not necessary to regulate or adapt the charging quantity; the secondary materials can be supplied continuously. This means that the changes in the process gas resulting from variations in the components of the organic material can be compensated by the controlled feed of oxygen for effectively influencing the post-combustion. The oxygen blown into the post-combustion air has a post-combustion efficiency 5 times greater than that of the indrawn air. This regulation is rapid and effective, and it helps make possible the continuous feed of complex secondary materials with variable organic constituents.

During the charging phase, the melt level in the process chamber rises. The slag analysis is adjusted in such a way that the slag remains metal-poor at all times. This is achieved by adjusting the desired slag matrix, the bath temperature, and also the oxygen potential, which is monitored by appropriate sampling during operation. A metal-poor slag supports the efficiency of the recovery of the recycling material. This means, in practice, that a metal-poor slag is realized by controlling the temperature of the process chamber and by injecting air, oxygen, or a mixture of them, possibly with the addition of other reducing agents and/or operating materials and additives.

After the molten bath has reached the desired level, the slag is removed; a residual amount of slag and the crude copper which has been produced, namely an iron-containing black copper, can remain in the process chamber. Then the process can be repeated until the quantity of metal sufficient for the conversion has accumulated in the process chamber. According to a process variant, the black copper can remain in the furnace or be subjected to further processing. This further processing can be carried out in another metallurgical unit.

The accumulated black copper is converted by known methods either in the TRBC or in some other unit. The process leads to blister copper as the end product and a slag containing enough tin and lead to produce a mixed tin economically from it. The converting step is necessary especially in cases where the process chamber is not to be integrated into a copper smelting facility. The accumulated crude copper, together with other suitable materials, is subjected to an oxidizing treatment. A large amount of pure oxygen is supplied to oxidize the chemically non-noble components of the crude copper and to convert them to slag. A blister copper is obtained with over 94% copper; also obtained is a slag, which contains enough tin and lead for the production of a crude mixed tin.

The course of the thermal treatment of a charge realized as a process cycle with continuous charging of the complex secondary materials with organic constituents and of operating materials and additives is the first step of the two-stage process of realizing the recovery of metal, in particular copper, from the melt, and tin from the slag.

At the beginning of a cycle, the process chamber is empty or contains residual amounts of slag and possibly (solidified) melt from the preceding batch. Coarse or lumpy materials are charged preferably at the beginning. Then the process chamber is preheated to operating temperature by the input of beat energy from a burner, for example. At the start of the process, at least a small amount of liquid slag must be present in the process chamber. Then preparations are made for the continuous charging of the complex secondary materials with organic constituents and of the operating materials and additives. These preparations comprise the following elements:

- the process chamber is sufficiently hot, i.e., above 1,200° C.;
- the off-gas system (waste heat boiler with post-combustion devices, systems for off-gas purification) is running smoothly;
- the peripheral speed of the process chamber is approximately 1-3 m/s;
- the desired charge make-up, the assembly of the individual material mixtures with respect to quantity and charging rate is selected on the basis of the characterization data, and the material begins to be conveyed; and
- the oxygen lance is prepared at the beginning of the charge: the burner and oxygen lance are positioned inside the process chamber.

After these preparatory steps, the continuous charging into the process chamber is begun. Under the process starting conditions, the processes described above, i.e., gasification, melting, formation of slag and metal melt, begin immediately.

Only a portion of the process gases, which contain large amounts of combustible component, is burned in the process chamber. For this purpose, oxygen is blown into the process chamber through a lance. The volumetric flow of the oxygen is determined as a function of the amount of organic material in the complex secondary materials and as a function of their characterization.

Combustion is not completed until the gases reach the downline off-gas pipe, configured as a waste heat boiler. The quantity of oxygen required for complete combustion is provided by:

- blowing in oxygen through openings in the hood;
- blowing in air through openings in the hood;
- drawing outside air into the hood; and
- drawing in outside air through flap valves on the off-gas pipe.

Under normal operating conditions, an oxygen content 6-10% is obtained at the end of the off-gas pipe. This excess is able to compensate quickly and reliably for short-term upward fluctuations of the combustible components in the process. Another off gas purification step can be carried out downstream from the off-gas pipe by the use of, for example, gas scrubbers, filters, etc. As a result of the continuous charging of the complex secondary materials with organic constituents within the thermal treatment process cycle, the content of the process chamber increases, and in parallel the level of material in the process chamber rises. The charging of the slag additives has the goal of ensuring an amount of liquid slag in the process chamber sufficient for high mass transfer at all times. During charging, the slag analysis is checked by means of sampling and temperature measurements. If any changes are necessary, the guar quantity of slag additives is adjusted.

When the chamber has been filled to the maximum possible extent, the slag analysis is adjusted if necessary. For this purpose, necessary additives are charged, and a special oxygen lance is immersed briefly in the melt. As a result, the mass transfer between the slag and the metal is greatly intensified. A short treatment is all that is needed for this. Then the slag is removed from the process chamber. The crude metal, e.g., the crude copper melt, remains in the process chamber.

To obtain the optimum quantity of crude copper for the converting step, the process is repeated. Whether the melting process should be carried out in two or more stages can be freely selected as a function of the total availability of the complex secondary materials with organic constituents as feed material.

The converting step is now conducted, which has the effect of increasing the quality of the crude copper from the melting process. The converting step is necessary especially in cases where the operation of the facility for processing complex secondary materials with organic constituents is not integrated into a copper smelting plant but is instead intended to operate on its own. The accumulated crude copper, together with other suitable materials, is subjected to an oxidizing treatment. By means of a large amount of pure oxygen, the chemically non-noble components of the crude copper (e.g., tin, lead, nickel, zinc, iron, etc.) are oxidized and transferred to the slag. Obtained are a blister copper consisting of more than 94% copper and a slag, which contains enough tin and lead for the economic production of a crude mixed tin.

The recovery of this crude mixed tin is the object of the second stage of the process. The crude mixed tin is extracted by the chemical reduction of the previously produced process slag of the converting step of the process, preferably within the scope of a multi-stage reduction in the furnace for mixed tin recovery. For this purpose, a device and a method are described in detail in DE 10 2012 005 401 A1, to which reference is herewith made under the aspect of the second process stage. The first process step is the melting and the production of black copper and a metal-poor slag.

According to the invention, a high reaction rate is achieved in the TBRC. A correspondingly high reaction rate is understood in particular to mean that a quantity of ten tons per hour of high-energy secondary substances is fed into the TBRC. A typical inner diameter of such a TBRC is 2.7 m.

According to the invention, a thin liquid slag is generated. The physical measurement quantity for defining such a thin liquid of the slag is the viscosity of the slag. Typically, such a thin liquid slag has a viscosity of at most 15 Pa·s.

According to a typical embodiment of the invention, the TBRC is supplied with ara energy-rich secondary material with an energy content of approximately 15 MJ/kg.

Typically, according to the present invention, materials with organic constituents are understood to be high-energy polymer plastics from the manufacture of electrical and/or electronic components. Alternatively or in addition, printed circuit boards can also be used as secondary material.

The energy content of the supplied secondary substances is preferably more than 15 MJ/kg.

When treating secondary materials within the process room, the organic components are removed from the material. During this withdrawal, a raw metal and a slag low in valuable metal are immediately produced. During the recovery process, metals like tin and/or lead case be extracted.

Immediate generation of the thin metal poor in valuable metal is understood to be in particular a period of less than 100 seconds, preferably less than 30 seconds and again preferably less than 10 seconds.

The throughput of at least ten tons of secondary material per hour already mentioned takes place in the first melting stage.

According to the state of the art, different names are used for the TBRC. In a nutshell, for example, it is customary to use only a designation as a "rotating converter" or as a "rotary converter".

According to the invention, gas is supplied in the upper region of the rotary converter regardless of the designation of the TBRC.

Typically, oxygen is supplied in such a way that the oxygen content in the exhaust gas is in a range from approximately 6% to 10% of the volume.

In the first, stage of the process, a slag is produced that contains a small amount of valuable materials. In addition, so-called black copper is produced in the first stage, which contains 60% to 85% by weight of copper. In addition, the black copper contains other metals, in particular tin, lead, nickel, zinc, iron and precious metals.

The copper and precious metal are preferably applied in the first stage of the process.

In the second stage of the process, the black copper produced in the first stage is refined. In the second stage of the process, a slag is produced, in which copper is produced, which still contains precious metals. The slag is fed to the mixed tin extraction.

In the second stage of the process, the main metals tin and lead are preferably applied. This means that the two metals tin and lead make up the essential proportion by weight of the metal produced or recovered during the second process stage.

The precious metals typically remain in combination with the copper during the entire process. The usual separation of the precious metals from the copper takes place in an electrolysis process following the process explained above.

According to the invention, both a thin slag with low viscosity and a molten metal are generated in the first stage of the recovery process. Due to the different physical density of the slag on the one hand and the metal melt on the other hand, the substances separate from each other.

In detail, a process is carried out during the first process stage in such a way that organic components are first removed from the material. This is preferably done by combustion and/or oxidation. As a result, the organic components release energy in the first stage of the process. In addition, the organic components can be used in the first process stage as reducing agents for the conversion of metal oxides to metals.

During the implementation of the first process stage, a liquid metal phase is created. This mainly contains copper. The copper contains precious metals and other metals. The other metals are, for example, nickel, tin and/or lead. As already mentioned above, the copper produced in the first process stage, which contains the above components, is referred to as black copper.

In the first stage of the process, a liquid slag phase is formed which is poor in valuable metals. The slag phase mainly contains base, easily oxidizable metals in the form of metal oxides. For example, these are iron in the form of iron oxide and/or aluminum in the form of aluminum oxide.

In the second stage of the process, an exhaust gas is generated which contains carbon monoxide, carbon dioxide and water. In addition, volatile compounds and metal oxides are contained in the exhaust gas. Such metal oxides are, for example, halogen acids, zinc oxide and/or lead oxide.

In detail, the black copper, which was produced during the first process stage, is converted during the process implementation in the second stage. This is preferably done by adding oxygen. The conversion of the black copper creates a liquid blister copper. Compared to black copper, this blister copper is a cleaned copper. Appropriate cleaning means that easily oxidizable metals, which are still contained in black copper, pass into the slag in the form of metal oxides.

During the second stage of the process, a slag is formed which is rich in tin and lead. The tin and lead are preferably contained in the slag in liquid form. In a further process following the second process stage, the slag from the second process stage can be reduced. This creates an alloy of tin and lead. Such a metal is called mixed tin.

As already mentioned, in addition to copper and precious metals, at least one other metal is recovered. Several other metals are preferably recovered. According to the already mentioned exemplary embodiment, at least tin and metal are recovered as further metals.

Typically, the exhaust gas contains a residual content of 6 to 10 percent by volume of oxygen. As a result, an almost complete post-combustion of combustible gas components and pollutants in the exhaust gas is achieved. After burning of at least 99 percent by weight of the combustible gas components and the pollutants in the exhaust gas typically takes place.

The invention claimed is:

1. A method for recovering noble metals and copper from secondary materials and other materials with organic constituents, the method comprising the steps of: removing organic components from the secondary materials and other materials with organic constituents by treatment in at least one process chamber; preparing the secondary materials and other materials with organic constituents for a recovery process, wherein the recovery process is configured in at least two stages, so that at least a first metal and a second metal are recoverable; controlling process variables of a first stage of the recovery process so that a thin fluid slag with a low viscosity, and a metal melt are formed by adding a slag generating substance; and, subsequent to the first stage of the recovery process, carrying out a process gas treatment with a process gas treatment system to reduce amounts of combustible gases and pollutants, wherein a total amount of organic constituents is 5-60% by weight, the process gas treatment including blowing in air to the process gas treatment system so that an off gas stream has an oxygen content in a range of 6% to 10% by volume, and wherein a Top Blown Rotary Converter having a peripheral velocity of 1 to 3 m/s is used in the first stage of the recovery process, the method further including preparing the secondary materials and other materials with organic constituents for the recovery process by comminution and presorting and characterization, wherein the characterization of the secondary materials and the other materials is dependent on the individual content of organic constituents in the secondary materials and the other materials, and mixing the secondary materials and other materials dependent on the characterization to obtain a mixed material fed to the recovery process with a constant content of organic material, and preparing and analyzing the secondary materials and other materials with organic constituents for the recovery process so that information on slag formers is used for feeding additives and operating materials so that a formation of a highly fluid slag is supported.

2. The method for recovering metals according to claim 1, including providing the secondary materials and other materials with organic constituents for the recovery process in a batchwise or continuous manner.

3. The method for recovering metals according to claim 1, including supplying the secondary materials and other materials with organic constituents continuously to the recovery process.

4. The method for recovering metals according to claim 1, including supplying the secondary materials and other materials with organic constituents discontinuously to the recovery process.

5. The method for recovering metals according to claim 1, including preparing the secondary materials and other materials with organic constituents for the recovery process so that an amount of organic material is present that supports a continuous feed.

6. The method for recovering metals according to claim 1, including providing a process gas treatment in an off-gas treatment chamber for reducing amounts of combustible gases and pollutants downstream from the first stage of the recovery process.

7. The method for recovering metals according to claim 6, including subjecting process gas to a post-combustion for reducing the amounts of combustible gases by adding oxygen.

8. The method for recovering metals according to claim 7, including adding pure oxygen.

9. The method for recovering metals according to claim 7, including adding a mixture consisting of pure oxygen and ambient air.

10. The method for recovering metals according to claim 7, wherein, inside the off-gas treatment chamber for reducing the amounts of combustible gases and pollutants, an oxygen concentration of 10% by volume is provided, so that a nearly complete post-combustion for reducing the amounts of combustible gases is supported even with a presence of varying percentages of organic constituents in the secondary materials and other materials.

11. The method for recovering metals according to claim 1, including removing the organic components from the secondary materials and other materials with organic constituents in the first stage of the recovery process by a thermal and oxidizing treatment in at least one process chamber.

12. The method for recovering metals according to claim 11, wherein, after the thermal and oxidizing treatment of the first stage of the recovery process, a copper-containing melt and a tin-containing slag are present, which are separated from each other.

13. The method for recovering metals according to claim 12, wherein the first stage of the recovery process is concluded by a converting treatment of the copper-containing melt.

14. The method for recovering metals according to claim 12, wherein a second stage of the recovery process comprises a chemically reducing treatment of the tin-containing slag.

15. The method for recovering metals according to claim 14, wherein a mixed tin process is conducted.

16. The method for recovering metals according to claim 14, wherein the method is conducted without a mixed tin process.

17. The method for recovering metals according to claim 1, wherein a process chamber of a second stage of the recovery process is formed by a melting furnace.

18. The method for recovering metals according to claim 1, wherein the secondary materials and other materials with organic constituents are formed by at least one of the group consisting of electronic scrap, cable scrap, and plastic scrap from electrical or electronic devices.

19. The method for recovering metals according to claim 1, wherein the total amount of organic material is in a range of 20-40% by weight.

* * * * *